United States Patent [19]

Ennulat

[11] 3,849,651

[45] Nov. 19, 1974

[54] CHARGE COUPLED SIGNAL PROCESSOR

[75] Inventor: Reinhard D. Ennulat, Alexandria, Va.

[73] Assignee: The United States of America as represented by the Secretary of the Army, Washington, D.C.

[22] Filed: Sept. 17, 1973

[21] Appl. No.: 397,528

[52] U.S. Cl. .................................................. 250/349
[51] Int. Cl. .................................................. G01t 1/16
[58] Field of Search ........... 250/330, 332, 333, 338, 250/340, 342, 349

[56] References Cited

UNITED STATES PATENTS 3,775,560 11/1973 Ebeling et al. .................. 250/349 X

*Primary Examiner*—James W. Lawrence
*Assistant Examiner*—Davis L. Willis
*Attorney, Agent, or Firm*—Edward J. Kelly; Herbert Berl; John E. Holford

[57] ABSTRACT

An improved thermal imaging system is proposed wherein charge coupled devices (CCDs) are used as analog multiplexers for the read-out of the scanned linear array of far-infrared detectors.

10 Claims, 8 Drawing Figures

CHARGE COUPLED SIGNAL PROCESSOR

The invention described herein may be manufactured, used, and licensed by or for the Government for governmental purposes without the payment to me of any royalty thereon.

BACKGROUND OF THE INVENTION

Present thermal imagery systems use mechanically scanning mirrors or other optical components to project the infrared radiation onto a linear array of infrared detectors. Thus the input image is moved relative to the linear array of detectors. These detectors convert sequentially the radiation signal received from each preselected image point into an electrical signal, which in turn can be displayed in the visible either by an opto-mechanically coupled linear display array (such as light emitting diodes) of a geometry similar to the detector array or by a cathode ray tube (CRT). In the former case each channel, comprised of a detector, amplifier, and a display element, transmits the infrared information during the whole dwell time (parallel signal processing), i.e. the time alloted to each image point, less switching time. In the case of the CRT device, the signals of all detectors have to be multiplexed during the dwell time to obtain one channel. This requires that the sampling time decrease as the number of detectors increase.

In order to compare these two approaches, identical systems are assumed with exception of the electronic multiplexer. Looking at the same scene, the performance of the multiplexed imager will be inferior to tha of the parallel signal processed device. This is explained by the fact that in the parallel signal processed device the total sampling time is approximately equal to the dwell time, while in the multiplexed device all detectors have to be sampled during this dwell time at the Nyquist rate. The latter results in additional noise because the sampling time amounts to a fraction of the dwell time.

SUMMARY OF THE INVENTION

The present invention provides a sequential signal sampling and processing system for thermal imaging, which generates a video signal suitable for CRT type displays and overcomes the above noted problems associated with prior art systems of this type. The technique used is basically to couple the far-infrared detectors with CCDs and thereby to form a new and highly versatile hybrid type of circuit.

BRIEF DESCRIPTION OF DRAWINGS

The invention is best understood with reference to the accompanying drawing wherein.

DESCRIPTION OF INVENTION

Figure 5:
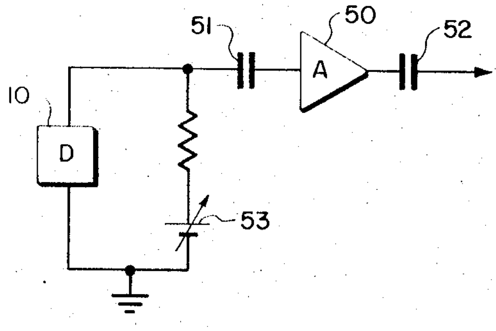
Figure 6:
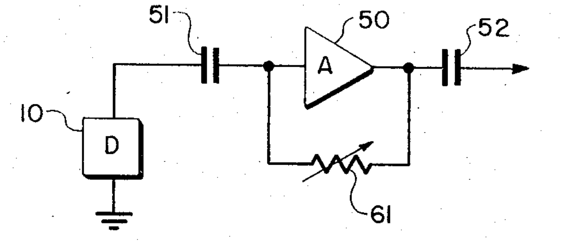
Figure 7:
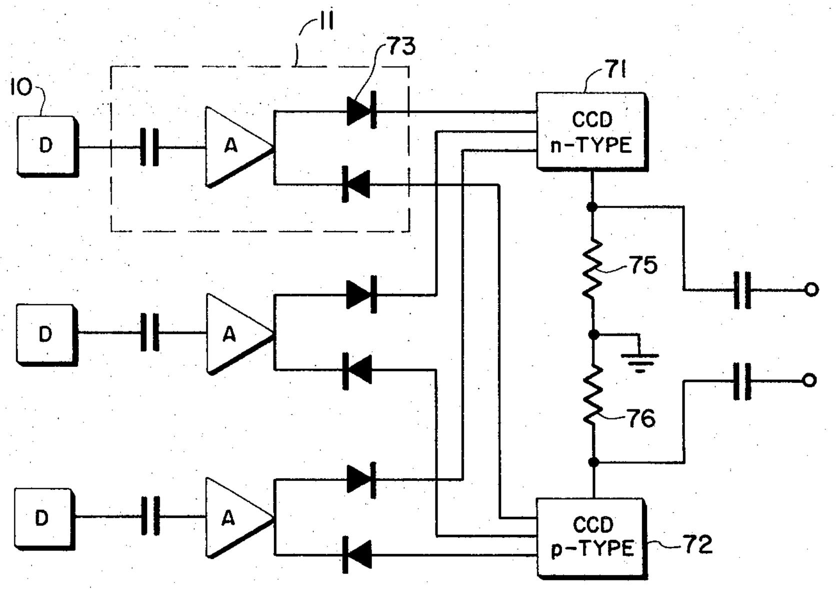
Figure 8:
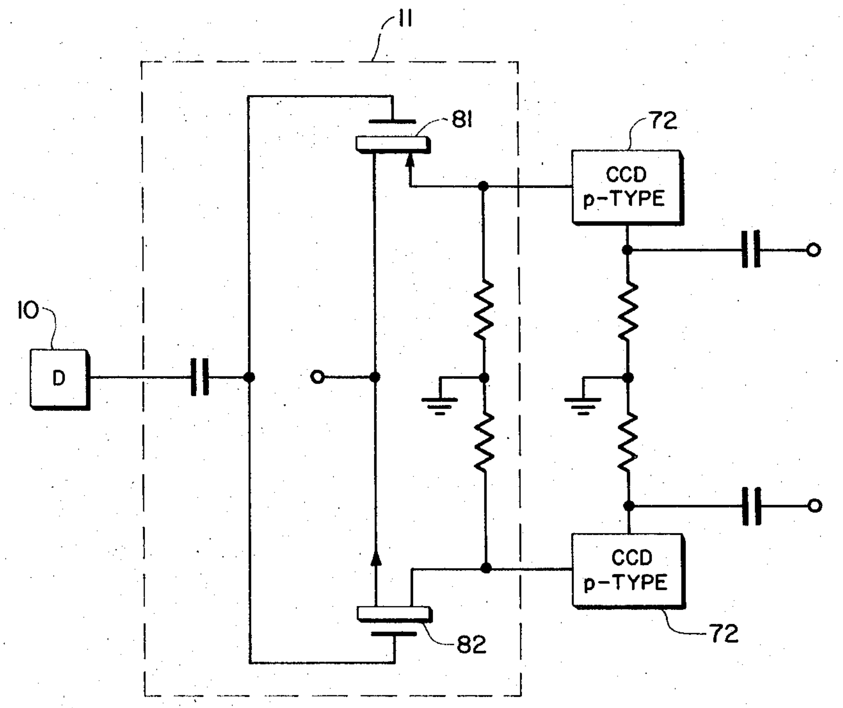

FIG. 5 depicts the basic circuit of a photoconductive detector and matched amplifier as part of the electronic circuit (EC);

FIG. 6 shows a photovoltaic detector circuit version of FIG. 5;

FIG. 7 describes a CCD multiplexer which is a.c. coupled to the detector array (standard d.c. restoration circuits are not shown) using complimentary CCDs; and FIG. 8 shows a version of the FIG. 8 multiplexer using CCDs of equal type.

DESCRIPTION OF INVENTION

Figure 1:
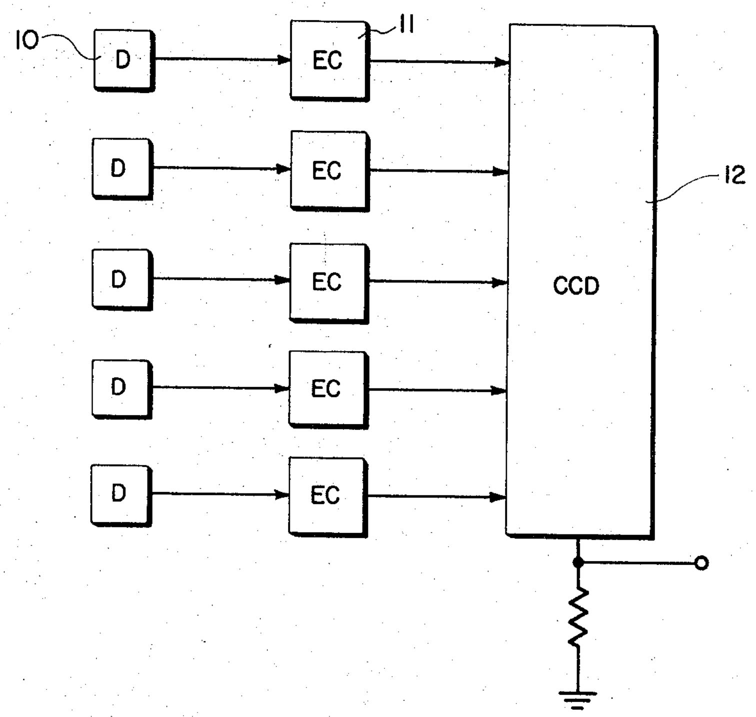
FIG. 1 shows a block diagram of a thermal image signal processing circuit according to the present invention.

FIG. 1 depicts the basic approach of the proposed invention. Each element 10 of a linear array of infrared detectors is connected by wires or deposited leads to an electronic circuit (EC) 11 which in turn is connected to the charge coupled device (CCD) 12. Whenever possible or practical the EC can be an integrated circuit built on the CCD substrate. The detector elements 10 convert the infrared radiation into electrical signals and the EC*a* 11 inject these signals into the CCD. The latter operates as a converter, converting multiple parallel inputs into a common and (if required) TV compatible serial output.

Figure 2:
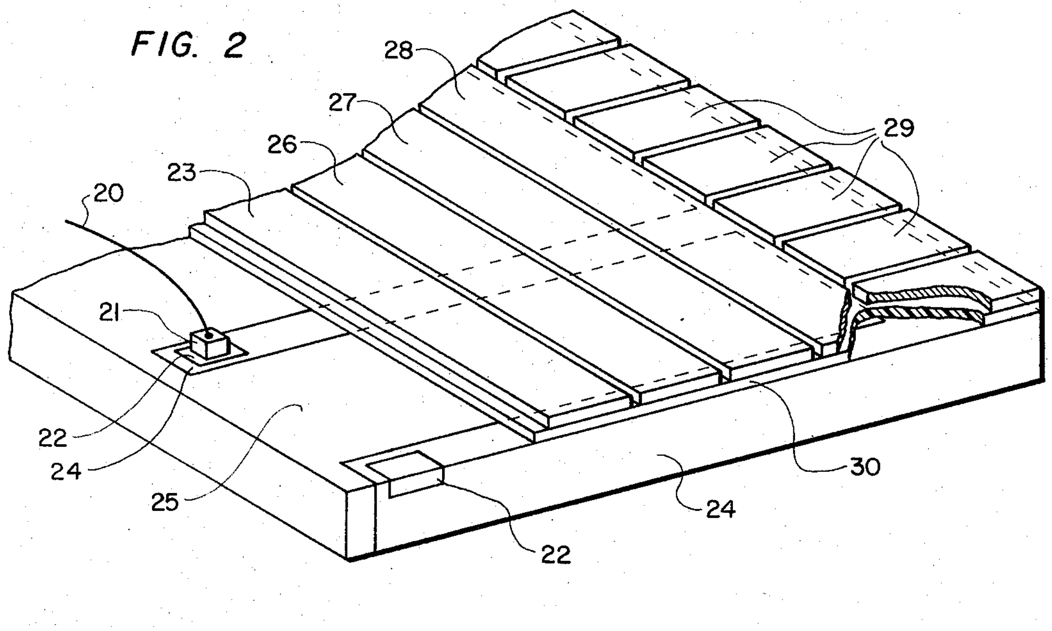
FIG. 2 shows one modification of a CCD suitable for use in the circuit of FIG. 1.

FIG. 2 shows in more detail the special CCD 12. A similar device is described by Tompsetti et al in the Transaction of the IEE ED–18, pg. 992, 1972, however, it is limited to the processing of visible radiation because of the wide band gap of silicon. Furthermore, this device consists only of that part of the structure which includes electrode 26 and the remaining elements to the right of the figure. In addition electrode 26 is transparent so that visible light signals can create the charge signals underneath. On the contrary, in the present invention the whole structure shown in FIG. 2 has to be shielded from bandgap radiation of greater than bandgap energy such as visible light. The signal generated by the EC 11 is applied over a lead 20 to the electrode 21 and thus to the n-type diffusion region 22. Region 24 represents the p-channel connecting the diffusion Region 22 to the p-channel of the read-out portion of the CCD, which runs at a right angle to and underneath of the line transfer electrodes 29. In an m-phased readout CCD only one channel 24 is connected to the appropriate electrode of each group of m line transfer electrodes 29, which are properly phased to affect a m-phased charge transfer. The example in FIG. 2 depicts a 3 phase read-out CCD. Region 25 represents the channel stop diffusion isolating the channels 24, and layer 30 is an insulating layer. Electrode 23 is the gate electrode, electrode 26 the storage electrode, electrode 27 the transfer electrode and electrode 28 the hold electrode.

The signal arriving at Region 22 generates a proportional number of minority carriers in Region 24 at the pn junction of the two. By proper manipulation of the potentials of the electrodes 23 and 26 (i.e. potential of electrode 26 must be larger then the threshold voltage and potential of electrode 23 must provide a sufficiently deep potential well). These minority carriers are transferred to and accumulated under the potential well beneath electrode 26. At the end of the dwell time of the mechanical scanning system the potential of gate 23 is reduced momentarily below the threshold value.

This action separates electrically all the diffusion regions 22 from the regions in 24 underneath of electrodes 26 and thereafter returns the region 22 to their sampling duty. Meantime packages associated with the electrode 26 are transferred along the p-channels in parallel and in unison from the potential well of 26 to the deeper potential well of electrode 28. Again this is achieved by proper manipulation of the potentials of the transfer electrode 27 and of the electrodes 26 and 28 (i.e. by standard 3 phase CCD operation). By proper phasing of the potentials of the individual electrodes 29 the charge packages enter the read-out portion of the CCD and are subsequently transferred to a standard, common output circuit (not shown in FIG. 2). Since the charge packages are separated by the width of two electrodes, this output circuit yields a voltage consisting of well separated pulses of equal width and of a height proportional to the input signals of the devices. This transfer of the charges from 28 to the output of the CCD device occurs during one dwell time.

In summary this device accumulates the signals of a whole detector array during the dwell time (prescribed by the mechanical scanner providing the optical input signal), transfers this information in parallel at the end of the dwell time within a time interval much smaller than the dwell time, and converts these charge packages into a sequential train of voltage pulses within the remaining part of the subsequent dwell time.

During the latter the next image line projected by the scanner into the detector array generates the next set of input signals which causes the accumulation of signal charges under electrode 26. Thus the signals of many parallel detector channels are multiplexed into one channel and the detectors are fully utilized during the dwell time. Of course, the dwell times and times of the voltage pulses operating the device in FIG. 2 have to be synchronized.

Figure 3:
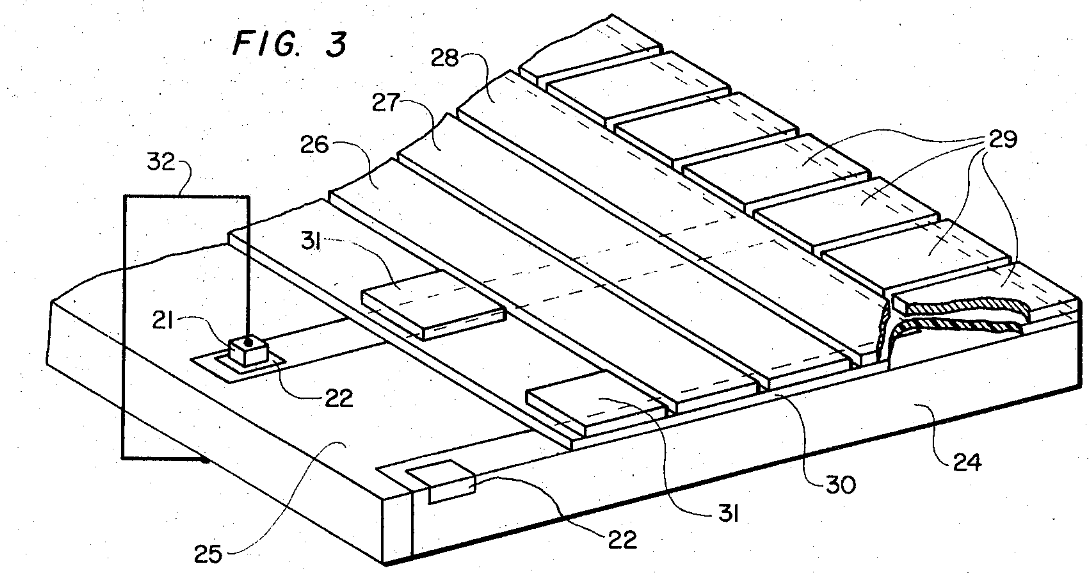
FIG. 3 shows a second modification of a CCD interchangeable with the FIG. 2 device.

FIG. 3 shows an alternate injection scheme, in which each p-type channel 24 has a separate gate 31 and a n-type diffusion region 22. Conductor 21 is the electrode of the diffusion region 22, layer 30 the insulating layer, region 25 the p-type channel stop diffusion and electrodes 26–29 are the same as those in FIG. 2. The pn junctions of the channels 24 are externally shorted to the base of the chip by the lead 32. This results in an excess of minority carriers in region 24 at the pn junctions independent of the gate voltages on electrodes 31. The output signals of the EC are connected to the electrodes 31, modulate the channel conductance between the diffusion regions 22 and the depletion regions (i.e. potential wells) maintained under the electrode 26 by the appropriate voltage. This results in a flow of minority carriers from region 22 to the depletion regions under electrode 26 that is proportional to the signal voltage. At the end of the scanner dwell time these charge packages are processed and read out as described above in conjunction with FIG. 2. It should be pointed out that the potentials of the electrodes 31 should not exceed the potential of 26 in order to achieve the required unidirectional charge transfer. Furthermore, it is obvious that the devices shown in FIGS. 2 and 3 operate also properly if the regions 24 are n-type channels and the diffusion regions 22 as well as the channel stop diffusions 25 are p-type. The only difference is that the polarity of all potentials have to be reversed and that the minority carriers are the holes. It is essential for the operation of the devices shown in FIGS. 2 and 3 that the input current signal is unidirectional, that the magnitude and polarity of the electrode potentials are chosen to achieve proper depletion in the channels 24 and under electrodes 29, and that the diodes formed by regions 22 are backbiased. These conditions in conjunction with the proper phasing of the voltage pulses are required by the present art. It should be pointed out that the injection of a signal via an input diode (i.e. diffusion region 22 in FIG. 2) or via a gate modulating the flow of minority carriers from a short circuited diode region 22 to a storage well under 26 in FIG. 3 are known procedures. (See Barbe et al., Report of Naval Research Lab Progress, March 1972, pp 1–11) However, the proper combination of the principles described in reference to Tompsetti and Barbe in conjunction with the schematics shown in FIG. 1 represents the basic advance of the state of the art claimed in this invention, i.e. utilization of infrared radiation, to which the Silicon CCDs are insensitive, during the entire dwell time and multiplexing of all the detector signals during the subsequent dwell time. These features combine the advantageous features of both parallel signal processing and multiplexing for thermal imaging devices.

To achieve proper operation of the CCD approach the EC 11 in FIG. 1 has to perform the following functions:

1. Suppresion of the high background level of the infrared radiation signal to prevent saturation of the CCD and to facilitate contrast enhancement.
2. Processing of the signal to permit its injection into the CCD.
3. Matching of the infrared detector impedance to the input impedance of the CCD.
4. Detector biasing without interfering with the CCD operation.
5. Automatic gain control of the detector element-EC combination to obtain a uniform response for all channels.

Figure 4:
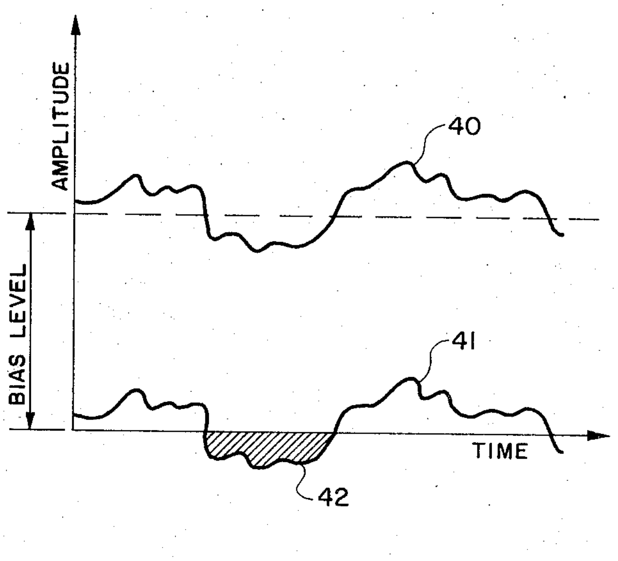
FIG. 4 shows a typical output waveform of a detector 10 and of the circuit (EC) 11.

The following addresses primarily function 1, because it determines the basic design of the EC 11, while the other functions can be realized by known electronic circuits. The curve 40 in FIG. 4 depicts the infrared signal and background radiation. For terrestial backgrounds the maximum peak to peak value of the desired infrared signals amount to only about one hundredth or even one thousands of the background level. This results in a contrast difference of the 1 to 0.1 percent. Since such contrast differences cannot be perceived in the visible by a human observer, the infrared contrast has to be enhanced by the EC 11.

Contrast enhancement by bucking is the simplest approach. The EC subtracts an appropriate amount of d.c. current from the input before injecting it into the CCD. By adjusting this bias level the operator selects a certain signal range. The upper limit of the latter is determined by the maximum charge the CCD can handle, while the lower limit is given by the fact that a CCD responds only to one polarity. Curve 41 in FIG. 4 shows that the device will lose the signal represented by the shaded area 42. To insure reliable operation, one has to maintain a reasonable d.c. level. Of course, the required bias circuits can be designed in various ways and the amplifier in the EC 11 depends strongly on the actual infrared detector used because the detector impedances range from below 100Ω for photoconductors to 1000 MΩ for photodiodes, FIGS. 5 and 6 depict amplifier schematics typical for photoconductive and photovoltaic detectors. Any other infrared detector yielding an electric output signal (such as thermistor bolometers and pyroelectric detectors) can be interfaced with the EC 11. The amplifier 50 can be any of a number of integrated circuit designs now commercially available. Coupling capacitors 51 and 52 permit separate biasing of input and output signals, e.g. simple resistance voltage dividers, to meet enhancement requirements. Signal amplitude can be varied by controlling the photoconduction potential in FIG. 5 and the amplifier feed back in FIG. 6. The exact value of the circuit elements will be obvious to those skilled in the art for detector selected.

FIG. 7 shows a different approach. Since most of the background radiation results in the d.c. level of the detector output, a.c. coupling of the detector output to the CCD multiplexer is a most effective method of contrast enhancement. In this approach the a.c. infrared signal is processed by two CCD's 71 and 72. One accepts the positive part of the signal and the other CCD accepts the negative one. The functional elements of the EC 11 are indicated in a schematic way. The a.c.-coupled amplifier is followed by a network of diodes 73 which directs the positive and the negative halfwaves of the signal to the CCD accepting only positive or negative signals, respectively. These diodes will usually be doped into the respective CCD substrate. The load impedances 75 and 76 of the CCD's provide a balanced output circuit reconstructing the a.c. signal. Standard d.c. restoration techniques are used to obtain the proper d.c. level for each line of the display and thus a true representation of the infrared image in the visible.

FIG. 8 shows a different embodiment of the FIG. 7 approach.

For applications requiring especially high frequency performance, it is advantageous to use only CCD's 72 built of p-type silicon, since its electron mobility is much bigger than the hole mobility of n-type material. In this case the EC 11 contains a phase inverter of the kind shown in FIG. 8, where 82 is a n-channel enhanced and 81 a p-channel enhanced field effect transistor (FET). Of course, the necessary bias circuits are not shown to simplify the schematics.

The advantages of the CCD signal processing approach can be summarized as follows:

1. Given a parallel signal processed system, this new rpproach permits multiplexing without decrease of signal to noise ratio. This feature not only eliminates display problems (e.g. remote display) but also reduces the system cost, because the CCD's should be much less expensive than the post amplifiers. Depending on the type of detectors required for a particular system application the EC circuits are either only slight modifications of the preamplifiers used for the parallel signal processing approach or can be simplified circuits having little or even no gain.

2. Given a multiplexed imaging system this new approach permits multiplexing without loss of signal to noise ratio. This advantage can be used to either improve the system performance or to drastically cut costs by reducing the number of channels. Obviously many variations of the above described circuits will occur to those skilled in the art, but the present invention is limited only as defined in the claims which follow.

I claim:

1. In a thermal imaging system wherein at least one line element of the thermal image is sampled simultaneously, an improved signal processing circuit comprising:

a linear array containing a plurality of detector elements responsive to far-infrared radiation;

a line imaging CCD with a like plurality of input diodes for signal injection; and circuit means coupling said detectors and said diodes for matching the impedances thereof and limiting the signal coupled therebetween to match the charge storage capabilities of the CCD.

2. The processing circuit according to claim 1 wherein said circuit means further includes:

contrast enhancement means for independently biasing the output of said detector and the input of said CCD.

3. The processing circuit according to claim 1 wherein said circuit means further includes contrast enhancement means for coupling only the a.c. component of said detector to said input diode.

4. The processing circuit according to claim 1 wherein said detector is a photovoltaic type.

5. The processing circuit according to claim 1 wherein said detector is a photoconductor.

6. The processing circuit according to claim 1 wherein said detector is a photodiode.

7. The processing circuit according to claim 1 wherein said system includes: two of said CCDs each providing an output of different polarity.

8. The processing circuit according to claim 7 wherein said CCDs have complementary diffusions of doping materials.

9. The processing circuit according to claim 8 wherein said CCDs have identical diffusions of doping materials.

10. The method of processing a serial type video signal from a plurality of parallel scanned line far-infrared detectors using a charge coupled line imaging device with m-phase synchronization on the lateral and line transfer electrodes and a gate electrode controlling an injection diode at each input, comprising the steps of:

gating charge from said diode to the first of said lateral transfer electrodes during a first dwell time;

transferring the accumulated charge from the first to the m'th lateral transfer electrode from said control electrode at the end of said first dwell time in a small fraction of the dwell time;

holding the charge under the m'th electrode until removed by the line transfer electrodes during a second dwell time; and simultaneously gating charge from said diode to said first lateral transfer electrode during said second dwell time.

* * * * *